United States Patent [19]

Whittington et al.

[11] 4,281,714

[45] Aug. 4, 1981

[54] LITHIUM SALTS AS ADDITIVES IN PETROLEUM RECOVERY PROCESSES

[75] Inventors: Lawrence E. Whittington, Katy; Warren C. Haltmar, Houston, both of Tex.

[73] Assignee: Texaco Inc., White Plains, N.Y.

[21] Appl. No.: 88,682

[22] Filed: Oct. 26, 1979

[51] Int. Cl.$^3$ .............................................. E21B 43/22
[52] U.S. Cl. ................................ 166/274; 252/8.55 D
[58] Field of Search ................. 252/8.55 D; 166/274, 166/275

[56] References Cited

U.S. PATENT DOCUMENTS

| | | | |
|---|---|---|---|
| 3,025,911 | 3/1962 | Bergman | 252/8.55 |
| 3,469,630 | 9/1969 | Hurd et al. | 252/8.55 X |
| 3,508,612 | 4/1970 | Reisberg et al. | 166/274 |
| 3,797,574 | 3/1974 | Feuerbacher | 166/275 X |
| 3,890,239 | 6/1975 | Dycus et al. | 252/8.55 |
| 4,042,030 | 8/1977 | Savins et al. | 252/8.55 X |
| 4,133,385 | 1/1979 | Kalfoglou | 166/275 X |
| 4,157,115 | 6/1979 | Kalfoglou | 166/275 X |

Primary Examiner—Herbert B. Guynn
Attorney, Agent, or Firm—Carl G. Ries; Robert A. Kulason; Jack H. Park

[57] ABSTRACT

Lithium salts are employed as sacrificial agents for use in surfactant flooding operations within subterranean petroleum reservoirs. They can be utilized within a preflush treatment and/or by incorporation within the surfactant slugs injected into the petroleum formation.

5 Claims, No Drawings

LITHIUM SALTS AS ADDITIVES IN PETROLEUM RECOVERY PROCESSES

BACKGROUND OF THE INVENTION

1. Field of the Invention

This invention concerns the use of reservoir conditioning agents in the course of a chemical flooding operation within a subterranean petroleum reservoir.

2. Description of the Prior Art

The crude oil which is accumulated in subterranean reservoirs is recovered or produced through one or more wells drilled into the reservoir. Initial production of the crude oil is accomplished by "primary recovery" techniques wherein only the natural forces present in the reservoir are utilized to produce the oil. However, upon depletion of these natural forces and determination of primary recovery a large portion of the crude oil remains trapped within the reservoir. Also many reservoirs lack sufficient natural forces to be produced by primary methods from the very beginning. Recognition of these facts has led to the development and use of many enhanced oil recovery techniques. Most of these techniques involve injection of at least one fluid into the reservoir to produce an additional amount of the crude oil therefrom. Some of the more common methods are water flooding, steam flooding, miscible flooding, $CO_2$ flooding, polymer flooding, surfactant flooding, caustic flooding and in situ combustion.

Water flooding which involves injection of water into the subterranean oil reservoir for the purpose of displacing the crude oil from the pore spaces of the reservoir rock toward the producing wells is the most economical and widely used of the enhanced oil recovery methods. Nevertheless water does not displace oil with high efficiency because of the immiscibility of oil and water and because of the resulting high interfacial tension between them.

Surfactant flooding involves the addition of one or more surface active agents or surfactants to the water flood for the purpose of minimizing the waterflooding problems mentioned above. Research in this area has produced a variety of effective surfactant compounds for use in petroleum recovery operations. For example, U.S. Pat. No. 3,468,377 discloses the use of petroleum sulfonates in waterflooding operations and U.S. Pat. No. 3,553,130 discloses the use of ethylene oxide adducts of alkyl phenols for the same purpose. The use in waterflooding operations of water-soluble surface active alkylene earth resistant polyglycol ethers is disclosed in U.S. Pat. No. 2,233,381. Other specialized surfactants, as will be discussed later, have been discovered to have special properties useful in waterflooding operations such as a tolerance for high salinity and diavalent ion concentrations often found in reservoir waters.

However, field operations employing surfactants and surface active agents in injected aqueous fluids have not always been entirely satisfactory due to the fact that these materials are often retained within the formation matrices to a relatively high degree resulting in an ever declining concentration of the surfactant materials as they progress through the reservoir. As a result large concentrations of surface active materials have heretofor been necessary to maintain a sufficient concentration at the oil water interface. Therefore, large quantities of these surfactant materials are usually required and due to the high cost of these materials the economic valuability of the surfactant flooding project is adversely effected.

This chemical retention phenomenon has been recognized by those skilled in the art of oil recovery and the use of certain "sacrificial compounds" has been disclosed for injection into the subterranean petroleum reservoir to reduce the amount of chemical retention therein. For example, U.S. Pat. No. 3,424,054 discloses the use of aqueous solutions of pyridine, U.S. Pat. No. 3,469,630 discloses the use of sodium carbonate and inorganic poly- phosphates and U.S. Pat. No. 3,437,141 discloses the use of soluble carbonates, inorganic polyphosphates and sodium borate in combination with a saline solution of a surfactant having both high and low molecular weight components. The use of aqueous lignosulfonate solutions as sacrificial components has been disclosed in U.S. Pat. Nos. 3,384,171, 3,700,031 and 4,157,115.

SUMMARY OF THE INVENTION

An effective amount of an aqueous solution of a lithium salt is injected into the reservoir prior to the injection of the aqueous surfactant solution in a surfactant flooding process for recovering petroleum from a subterranean petroleum reservoir wherein the reservoir is penetrated by at least one injection well and at least one production well said wells being in fluid communication with each other wherein the surfactant flooding process comprises the steps of injecting an aqueous surfactant solution through the injection well into the reservoir, forcing the surfactant solution through the reservoir and recovering petroleum from the production oil. The lithium salt may also be included within the aqueous surfactant solution, and, if such is the case, the initial injection step of an aqueous fluid comprising lithium salt alone may be omitted.

DESCRIPTION OF THE PREFERRED EMBODIMENT

The mechanisms by which surfactants are retained within the reservoir matrices are not completely understood. Adsorption effects are thought to account for the majority of the chemical retention of surfactant materials within the reservoir. To this end a sacrificial material is injected by the process of this invention through an injection well into a subterranean reservoir to preferably occupy or cover all the potential adsorption sites of the rock within the subterranean reservoir thereby reducing the extent of the retention of the more expensive surfactant materials injected there behind or concurrently. A sacrificial agent performs best when it exhibits high adsorption on active sites of rock surfaces and thus diminishes surfactant and/or polymer adsorption. The functional groups on the sacrificial agent molecules apparently enhance adsorption either by hydrogen bonding or electrostatic attracting to active sites on the rock surfaces.

A satisfactory sacrificial material has at least three important characteristics. First, it should be less expensive than the surfactant on a cost effectiveness basis since it is to be sacrificed or retained by the formation, probably not to be recovered. Next, it must be retained readily by the subterranean formation matrix, preferably the sacrificial material should be retained more readily than the surfactant to be used in the process. The third important characteristic of a sacrificial agent is that the presence of such retained sacrificial material should retard or eliminate retention of the surfactant within the formation matrices.

The sacrificial material may not have a detrimental effect on the recovery efficiency of the surfactant flooding operation. Additional oil is usually recovered only if the sacrificial material is followed by or is admixed with a surfactant which will effectively increase the amount of oil displaced from the subterranean formation. Such surfactants are most often employed in aqueous solutions for injection into the reservoir; however, in some circumstances it is desirable to employ the surfactant within an oil water emulsion with oil as the external phase. It is well known that surfactant molecules have a marked tendency to be retained within the matrices of a subterranean petroleum reservoir and become lost to the enhanced recovery process. It is believed that the majority of this retention is due to adsorption effects caused mainly by the clay components within the reservoir. As discussed above, many compounds have been used as "sacrificial agents" to compete with the surfactant for the available adsorption sites within the reservoir matrices thus reducing a loss of the surfactant from the surfactant flooding. We have discovered that the use of lithium salts and preferably lithium chloride as sacrificial agents will increase the oil recovery in a typical surfactant flooding operation. It is suggested that the effectiveness of lithium chloride is due to the adsorption of the lithium atom on the clay molecules present in the rock material, altering the electronic charge of the clay and thereby reducing the attraction of the surfactant to the clay.

A series of experiments was conducted to demonstrate the effectiveness of our invention. Four separate surfactant floods were conducted in four different Berea sandstone cores, 5.08 cm in diameter and ranging from 14.8 to 17.4 cm in length. The results of the four core floods is reported in Table 1 below.

TABLE I

| Experiment Number | Pore Volume Surfactant Solution | Concentration of Surfactant | Concentration of LiCl | Oil Recovery Efficiency($E_R$) | Residual Oil Saturation($S_{OR}$) |
| --- | --- | --- | --- | --- | --- |
| 1 | 0.14 | 5% | 300 ppm | 0.74 | 0.10 |
| 2 | 0.14 | 5% | 0 | 0.69 | 0.12 |
| 3 | 0.20 | 5% | 300 ppm | 0.91 | 0.02 |
| 4 | 0.20 | 5% | 0 | 0.74 | 0.10 |

The surfactant solution for each core flood consisted of a five percent solution of a petroleum sulfonate (3.5%)/solubilizer(1.5%) blend. The petroleum sulfonate was a 370 average molecular weight composition. The solubilizer was a nonyl phenol polyethoxy sulfonate of the formula:

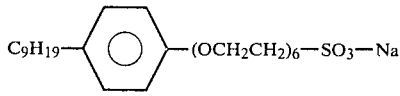

300 parts per million of lithium chloride were added as indicated. The injection of the discrete pore volume of surfactant solution was followed by a continuous injection of a 1,000 ppm aqueous solution of Xanflood ®, an organic polysacchride polymer which is commercially available.

The results of these experiments show that the addition of lithium chloride as a sacrificial agent produces an increased oil recovery efficiency in the surfactant flooding process. The first two experiments, conducted with 0.14 pore volumes of surfactant solution, show an increase from 0.69 to 0.74 in the oil recovery efficiency process as a whole with the addition of the 300 ppm lithium chloride solution to the surfactant slug. The third and fourth experiments, conducted with a 0.20 pore volume surfactant slug show an even greater increase in oil recovery efficiency from 0.74 to 0.91 with the addition of lithium chloride.

Although our experiments were conducted with the lithium salt being present in the surfactant slug only, in one preferred embodiment of our invention the lithium chloride salt may be added to a preflush slug which is injected prior to the injection of the surfactant slug without inclusion of the lithium chloride salt in the surfactant slug itself. In another preferred embodiment the lithium salt may be added to both a preflushed slug and the surfactant slug. In still another preferred embodiment the lithium salt may be added to the preflush slug, the surfactant slug and a following polymer slug. In yet another preferred embodiment the addition of the lithium salt to the preflush slug or the preflush slug itself may be omitted itself.

Although the use of lithium salts as sacrificial agents has been demonstrated herein in conjunction with a petroleum sulfonate/solubilizer surfactant system, such use can easily be extended to any of the other surfactants useful in oil recovery processes since the surfactant retention mechanisms are identical.

The above cited example and embodiments are presented to show the best mode for practice of the invention as contemplated by the inventors. As such the example and embodiments, should be considered as illustrative and not limitative. The invention itself is limited only to the following claims.

We claim:

1. In a surfactant flooding process for recovering petroleum from a subterranean petroleum reservoir wherein the reservoir is penetrated by at least one injection well and at least one production well, said wells being in fluid communication with said formation, wherein the process comprises the steps of injecting an aqueous surfactant solution through the injection well into the reservoir, forcing the surfactant solution through the reservoir and recovering petroleum from the production well, the improvement for reducing the amount of surfactant retained by the formation comprising:

injecting into the reservoir, prior to the injection of the aqueous surfactant solution, an aqueous solution containing an amount of lithium chloride effective for reducing surfactant retention by the formation.

2. The method of claim 1 wherein the surfactant solution comprises an effective amount of an aqueous solution of a petroleum sulfonate surfactant combined with an effective amount of a solubilizer of the formula:

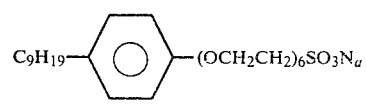

3. The method of claim 1 wherein the forcing of the surfactant solution through the reservoir is accomplished by the injection of an effective amount of an aqueous solution of an organic polysaccharide polymer.

4. In a surfactant flooding process for recovering petroleum from a subterranean petroleum reservoir wherein the reservoir is penetrated by at least one injection well and at least one production well, said wells being in fluid communication with said formation, wherein the process comprises the steps of injecting an aqueous surfactant solution through the injection well into the reservoir, forcing the surfactant solution through the reservoir and recovering petroleum from the production well, the improvement comprising:

adding lithium chloride to the aqueous surfactant solution in an amount sufficient to reduce surfactant retention by the formation, said surfactant solution being an aqueous solution of a petroleum sulfonate combined with a solubilizer of the formula:

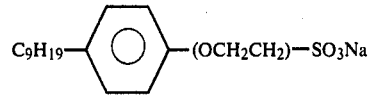

5. The method of claim 4 wherein the forcing of the surfactant solution through the reservoir is accomplished by the injection of an effective amount of an aqueous solution of an organic polysaccharide polymer.